(12) United States Patent
Le et al.

(10) Patent No.: US 8,890,541 B2
(45) Date of Patent: Nov. 18, 2014

(54) METHOD AND APPARATUS FOR CALIBRATING DEEP-READING MULTI-COMPONENT INDUCTION TOOLS WITH MINIMAL GROUND EFFECTS

(75) Inventors: Fei Le, Houston, TX (US); Michael B. Rabinovich, Houston, TX (US); Stanislav W. Forgang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 458 days.

(21) Appl. No.: 13/211,863

(22) Filed: Aug. 17, 2011

(65) Prior Publication Data

US 2013/0043884 A1 Feb. 21, 2013

(51) Int. Cl.
| | | |
|---|---|---|
| G01R 35/00 | (2006.01) | |
| G01V 13/00 | (2006.01) | |
| G01V 3/28 | (2006.01) | |

(52) U.S. Cl.
CPC .. *G01V 13/00* (2013.01); *G01V 3/28* (2013.01)
USPC ............................. 324/601; 324/323; 324/339

(58) Field of Classification Search
USPC ................................................ 324/601, 202
IPC ............................................ E21B 47/00,23/00
See application file for complete search history.

(56) References Cited

U.S. PATENT DOCUMENTS

| | | | |
|---|---|---|---|
| 5,293,128 A | 3/1994 | Zhou | |
| 5,905,379 A | 5/1999 | Orban et al. | |
| 7,141,981 B2 | 11/2006 | Folberth et al. | |
| 7,319,331 B2 | 1/2008 | Pelegri et al. | |
| 7,414,391 B2 * | 8/2008 | Homan et al. | 324/202 |
| 7,598,741 B2 | 10/2009 | Fanini et al. | |
| 7,629,792 B2 | 12/2009 | Pelegri et al. | |
| 7,652,478 B2 | 1/2010 | Pelegri | |
| 7,839,148 B2 | 11/2010 | Vehra et al. | |
| 7,915,895 B2 | 3/2011 | Chemali et al. | |
| 7,932,723 B2 | 4/2011 | Forgang et al. | |
| 2006/0164092 A1 | 7/2006 | Forgang et al. | |
| 2009/0240435 A1 | 9/2009 | Itskovich et al. | |

FOREIGN PATENT DOCUMENTS

WO 9401791 A1 1/1994

OTHER PUBLICATIONS

Heisig, G., et al., "Downhole Diagnosis of Drilling Dynamics Data Provides New Level Drilling Process Control to Driller," SPE 49206, pp. 649-658, SPE Annual Technology Conference and Exhibition, New Orleans, LA (Sep. 1998).

* cited by examiner

*Primary Examiner* — Vincent Q Nguyen
(74) *Attorney, Agent, or Firm* — Mossman Kumar & Tyler PC

(57) ABSTRACT

An apparatus and method for calibrating a multi-component induction logging tool. The method may include orienting a Z-transmitter coil to be substantially orthogonal to at least one Z-receiver coil, positioning an X-transmitter coil disposed on the logging tool so that the X-transmitter coil is substantially parallel to a conducting surface; encompassing the Z-transmitter coil, the X-transmitter coil, and at least one Z-receiver coil of the logging tool with at least one conducting loop of a calibrator; and calibrating the logging tool using the calibrator. The apparatus may include a calibrator configured to receive the logging tool. The Z-transmitter coil and the Z-receiver coil may be located on separate subs that are detachable from one another.

9 Claims, 5 Drawing Sheets

METHOD AND APPARATUS FOR CALIBRATING DEEP-READING MULTI-COMPONENT INDUCTION TOOLS WITH MINIMAL GROUND EFFECTS

FIELD OF THE DISCLOSURE

This disclosure generally relates to exploration for hydrocarbons involving electrical investigations of a borehole penetrating an earth formation.

BACKGROUND OF THE DISCLOSURE

Electrical earth borehole logging is well known and various devices and various techniques have been described for this purpose. Broadly speaking, there are two categories of devices used in electrical logging devices. In the first category, a transmitter (such as a guarded electrode) is uses in conjunction with a diffuse return electrode (such as the tool body). A measured electric current flows in a circuit that connects a voltage source to the transmitter, through the earth formation to the return electrode and back to the voltage source in the tool. In the guarded electrode, a second or center electrode is fully or at least partially surrounded by a guard electrode. Provided both electrodes are kept at the same potential, a current flowing through the center electrode is focused into the earth formation by means of the guard electrode. Generally, the center electrode current is several orders of magnitude smaller than the guard current.

In inductive measuring tools, an antenna within the measuring instrument induces a current flow within the earth formation. The magnitude of the induced current is detected using either the same antenna or a separate receiver antenna. The present disclosure belongs to the second category.

Calibration is a critical procedure before making measurements with any electrical logging tool because it allows correlations and corrections of the realistic tool responses in order to match modeled tool responses in ideal situations which are necessary for accurate interpretation of the electrical logs. With tools in the second category, calibration errors may occur due to variations and uncertainties in ground resistivity at different locations where the calibration processes take place. The ground effect becomes more severe when the depths of investigation of the induction tools increase. Therefore, in order to reduce the ground effect when calibrating deep-reading induction tools, particular procedures are usually taken which involve lifting the entire deep-reading induction tool to a significant height (usually over 20 feet) above ground and then performing the calibration measurements (the "air-hang" method). This method is not only expensive but unsafe as well. This disclosure addresses the minimization and mitigation of the errors induced by the ground effect without using the "air-hang" method.

SUMMARY OF THE DISCLOSURE

In aspects, the present disclosure is related to methods and apparatuses for calibrating a deep-reading multi-component induction logging tool with minimal ground effect, without the need to perform an "air-hang" measurement One embodiment according to the present disclosure may include a method of calibrating a multi-component induction logging tool, comprising: orienting a first sub including a Z-transmitter coil to be substantially orthogonal to at least one Z-receiver coil on a second sub, the first sub and the second sub being detachable parts of a multi-component induction logging tool; positioning the multi-component induction logging tool such that an X-transmitter coil on the second sub is substantially parallel to a conducting surface; encompassing the Z-transmitter coil, the X-transmitter coil, and the at least one Z-receiver coil with at least one conducting loop of a calibrator; and using the calibrator to calibrate the multi-component induction logging tool.

Another embodiment according to the present disclosure may include an apparatus for calibrating a multi-component induction logging tool, comprising: at least one conducting loop configured to encompass a Z-transmitter coil, an X-transmitter coil, and at least one Z-receiver coil, the coils being disposed on the multi-component induction logging tool, wherein the multi-component logging tool includes a first sub and a second sub, wherein the first sub includes the Z-transmitter coil and the second sub includes the at least one Z-receiver coil and the X-transmitter coil, the subs being detachable and configured for reorientation relative to each other; and at least one housing configured to house the at least one conducting loop.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

This disclosure generally relates to exploration for hydrocarbons involving electrical investigations of a borehole penetrating an earth formation. More specifically, this disclosure relates calibrating a multi-component induction logging tool.

Figure 1:
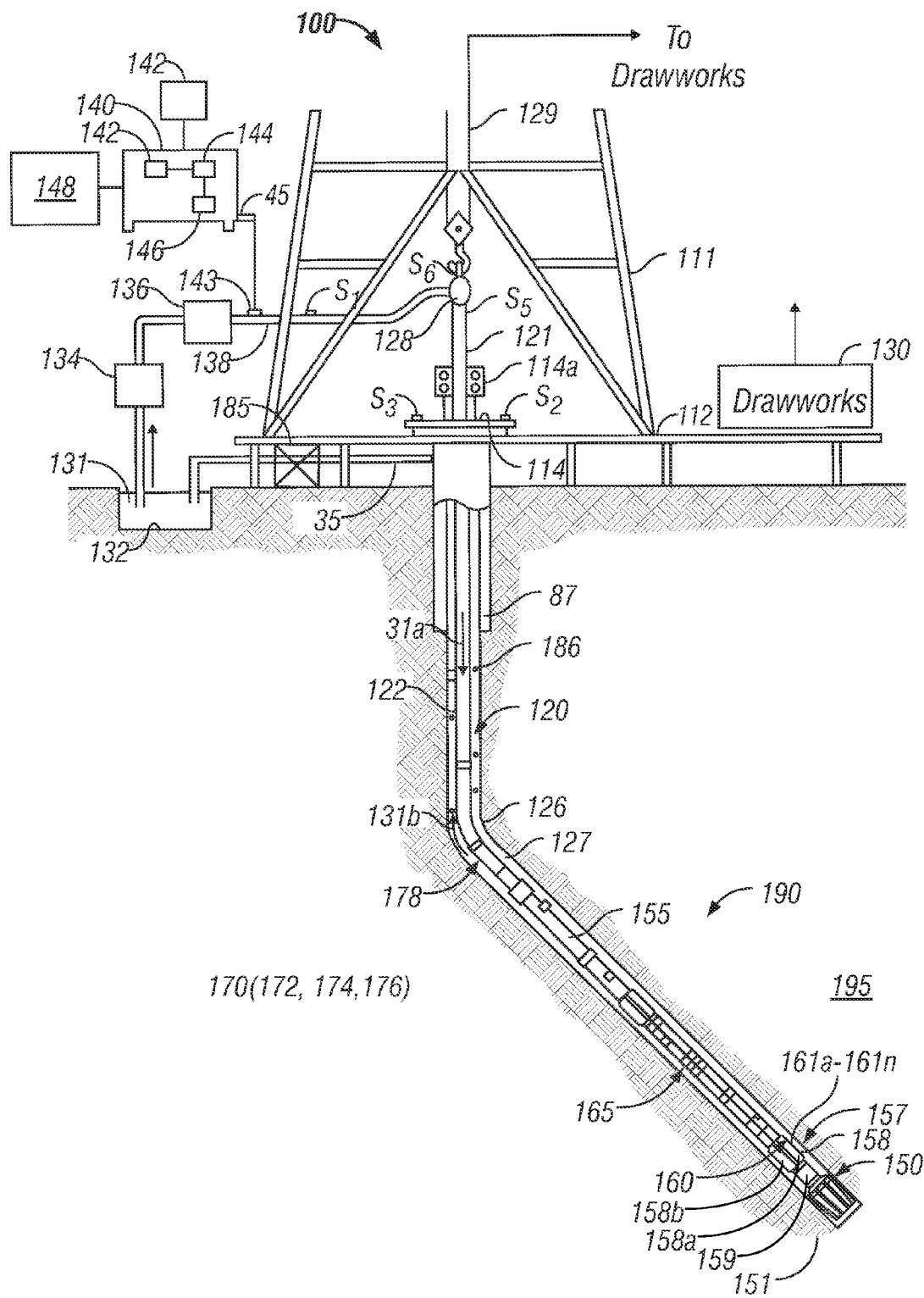
FIG. 1 shows a schematic of a deep-reading multi-component induction logging tool deployed in a wellbore along a drill string according to one embodiment of the present disclosure.

FIG. 1 is a schematic diagram of an exemplary drilling system 100 that includes a drill string having a drilling assembly attached to its bottom end that includes a steering unit according to one embodiment of the disclosure. FIG. 1 shows a drill string 120 that includes a drilling assembly or bottom-hole assembly (BHA) 190 conveyed in a borehole 126. The drilling system 100 includes a conventional derrick 111 erected on a platform or floor 112 which supports a rotary table 114 that is rotated by a prime mover, such as an electric motor (not shown), at a desired rotational speed. A tubing (such as jointed drill pipe) 122, having the drilling assembly 190, attached at its bottom end extends from the surface to the bottom 151 of the borehole 126. A drill bit 150, attached to BHA 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor $S_1$ in line 138 provides information about the fluid flow rate. A surface torque sensor $S_2$ and a sensor $S_3$ associated with the drill string 120 respectively provide information about the torque and the rotational speed of the drill string 120. Tubing injection speed is determined from the sensor $S_5$, while the sensor $S_6$ provides the hook load of the drill string 120.

In some applications, the drill bit 150 is rotated by only rotating the drill pipe 122. However, in many other applications, a downhole motor 155 (mud motor) disposed in the BHA 190 also rotates the drill bit 150. The rate of penetration for a given BHA 190 largely depends on the WOB or the thrust force on the drill bit 150 and its rotational speed.

The mud motor 155 is coupled to the drill bit 150 via a drive shaft disposed in a bearing assembly 157. The mud motor 155 rotates the drill bit 150 when the drilling fluid 131 passes through the mud motor 155 under pressure. The bearing assembly 157, in one aspect, supports the radial and axial forces of the drill bit 150, the down-thrust of the mud motor 155 and the reactive upward loading from the applied weight-on-bit.

A surface control unit or controller 140 receives signals from the downhole sensors and devices via a sensor 143 placed in the fluid line 138 and signals from sensors $S_1$-$S_6$ and other sensors used in the system 100 and processes such signals according to programmed instructions provided to the surface control unit 140. The surface control unit 140 displays desired drilling parameters and other information on a display/monitor 142 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices. The data may be transmitted in analog or digital form.

The BHA 190 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the earth formation 195 surrounding the drilling assembly 190. Such sensors are generally known in the art and for convenience are generally denoted herein by numeral 165. The BHA 190 may further include a variety of other sensors and devices 159 for determining one or more properties of the BHA (such as vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.) For convenience, all such sensors are denoted by numeral 159.

The drilling assembly 190 includes a steering apparatus or tool 158 for steering the drill bit 150 along a desired drilling path. In one aspect, the steering apparatus may include a steering unit 160, having a number of force application members 161a-161n, wherein the steering unit is at partially integrated into the drilling motor. In another embodiment, the steering apparatus may include a steering unit 158 having a bent sub and a first steering device 158a to orient the bent sub in the wellbore and the second steering device 158b to maintain the bent sub along a selected drilling direction.

The MWD system may include sensors, circuitry and processing software and algorithms for providing information about desired dynamic drilling parameters relating to the BHA, drill string, the drill bit and downhole equipment such as a drilling motor, steering unit, thrusters, etc. Exemplary sensors include, but are not limited to, drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED. Suitable systems are also discussed in "Downhole Diagnosis of Drilling Dynamics Data Provides New Level Drilling Process Control to Driller", SPE 49206, by G. Heisig and J. D. Macpherson, 1998.

The drilling system 100 can include one or more downhole processors at a suitable location such as 193 on the BHA 190. The processor(s) can be a microprocessor that uses a computer program implemented on a suitable machine readable medium that enables the processor to perform the control and processing. The machine readable medium may include ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 142 can process the surface measured data, along with the data transmitted from the downhole processor, to evaluate formation lithology. While a drill string 120 is shown as a conveyance system for sensors 165, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. A downhole assembly (not shown) may include a bottomhole assembly and/or sensors and equipment for implementation of embodiments of the present disclosure on either a drill string or a wireline.

Figure 2:
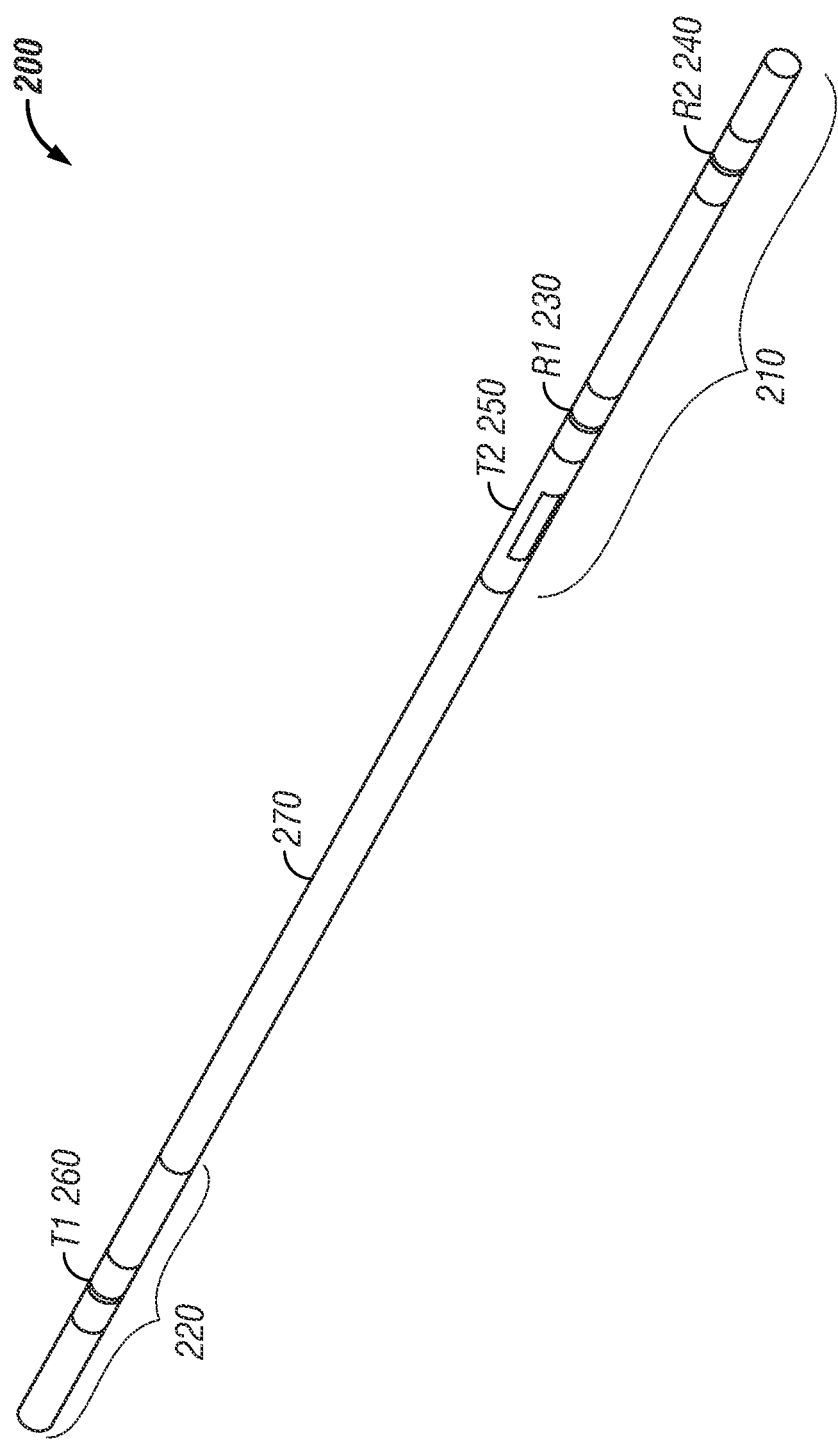
FIG. 2 shows a schematic close up of the deep-reading multi-component induction logging tool according to one embodiment of the present disclosure.

FIG. 2 shows one embodiment of a multi-component MWD/LWD tool 200 according to the present disclosure. The tool 200 may be part of the evaluation sensors 165. Tool 200 may include a first sub 210 and a detachable second sub 220. The first sub 210 may include one or more receiver coils 230, 240 directed along the Z-direction and an X-transmitter coil 250 directed along the X-direction. The second sub 220 may include a Z-transmitter coil 260 directed along the Z-direction. In some embodiments, tool 200 may include one or more subs between the first sub 210 and the second sub 220. Tool 200 may be configured for deep-reading by adjusting the distance between the transmitter coil 260 and at least one of the receiver coils 230, 240 to about 4 meters or more. The use of tool in a deep-reading configuration should not be construed as a limitation, as embodiments of the present disclosure may be used with standard tool configurations.

Figure 3:
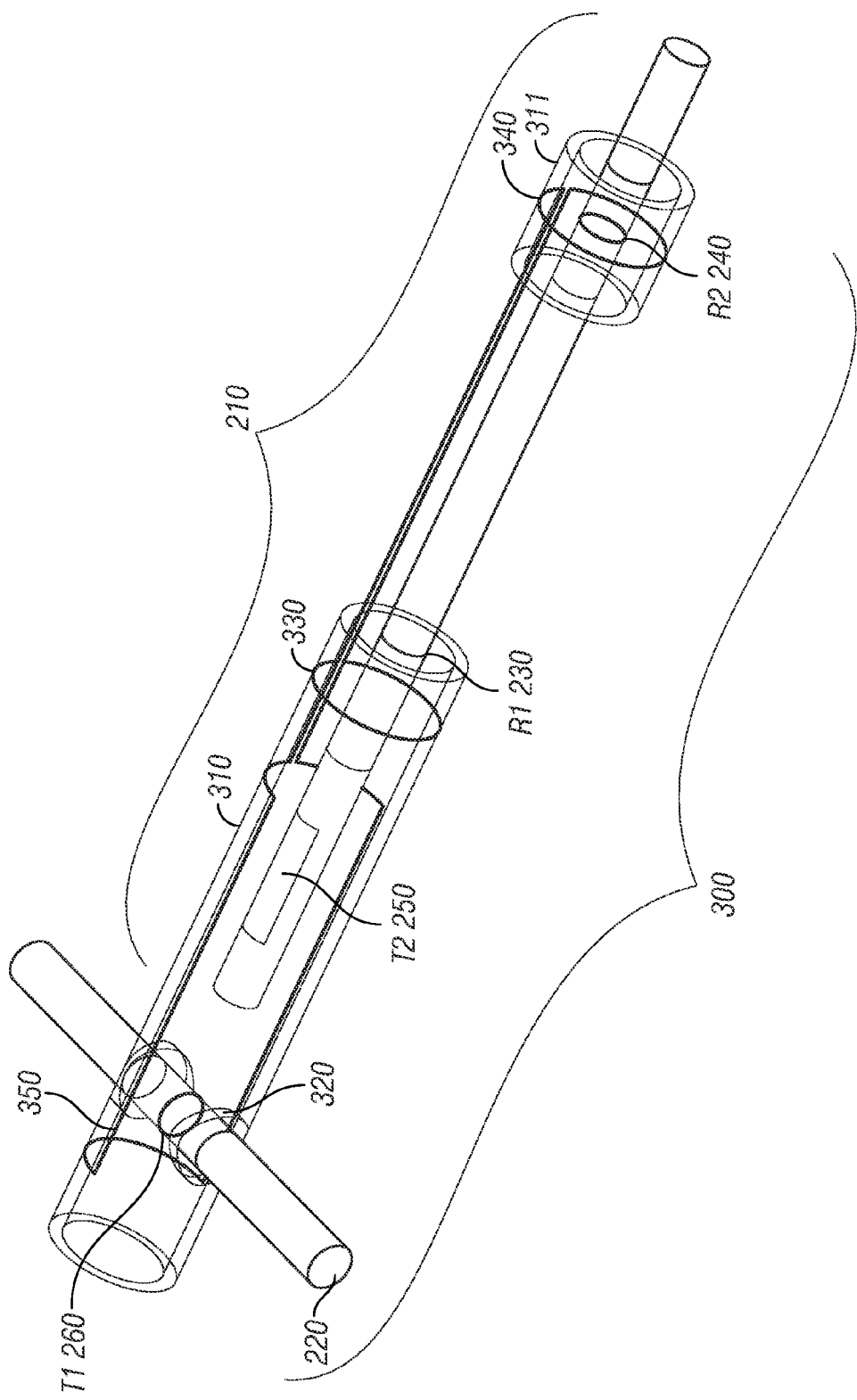
FIG. 3 shows a schematic of the deep-reading multi-component induction logging tool in a calibrator according to one embodiment of the present disclosure.

FIG. 3 shows the tool 200 positioned within a calibrator 300. The calibrator 300 may include two housings 310 and 311 configured to encompass at least part of tool 200. Housing 310 may include an opening 320 dimensioned to allow reorientation of detachable sub 220 relative to sub 210. Here, sub 220 is shown detached and reoriented in a direction substantially orthogonal to the Z-direction and inserted through opening 320. Opening 320 may be encompassed by conducting loop 350. Sub 210 may be positioned so that the X-transmitter coil 250 is reoriented in a direction substantially parallel to the surface of the earth. In some embodiments, calibrator 300 may include a single housing. Calibrator 300 may include conducting loops 330, 340 configured to encompass each of the at least two receiver coils 230, 240 and conducting loop 350 configured to encompass transmitter coils 250, 260. The conducting loops 330, 340, 350 may be interconnected with electrical conductors. One or more of the conducting loops, alone or as interconnected, may be dimensioned to form at least one conducting loop that encompasses the transmitter coils 250, 260 and at least one receiver coil 230, 240. The calibration 300 may be configured for use with deep-reading and standard multi-component induction tools. Deep-reading multi-component induction tools may have at least one transmitter-receiver space of 4 meters or more. Some deep-reading multi-component induction tools may achieve deep-reading while the transmitter-receiver spacing is less than 4 meters through configuration modifications.

Figure 4:
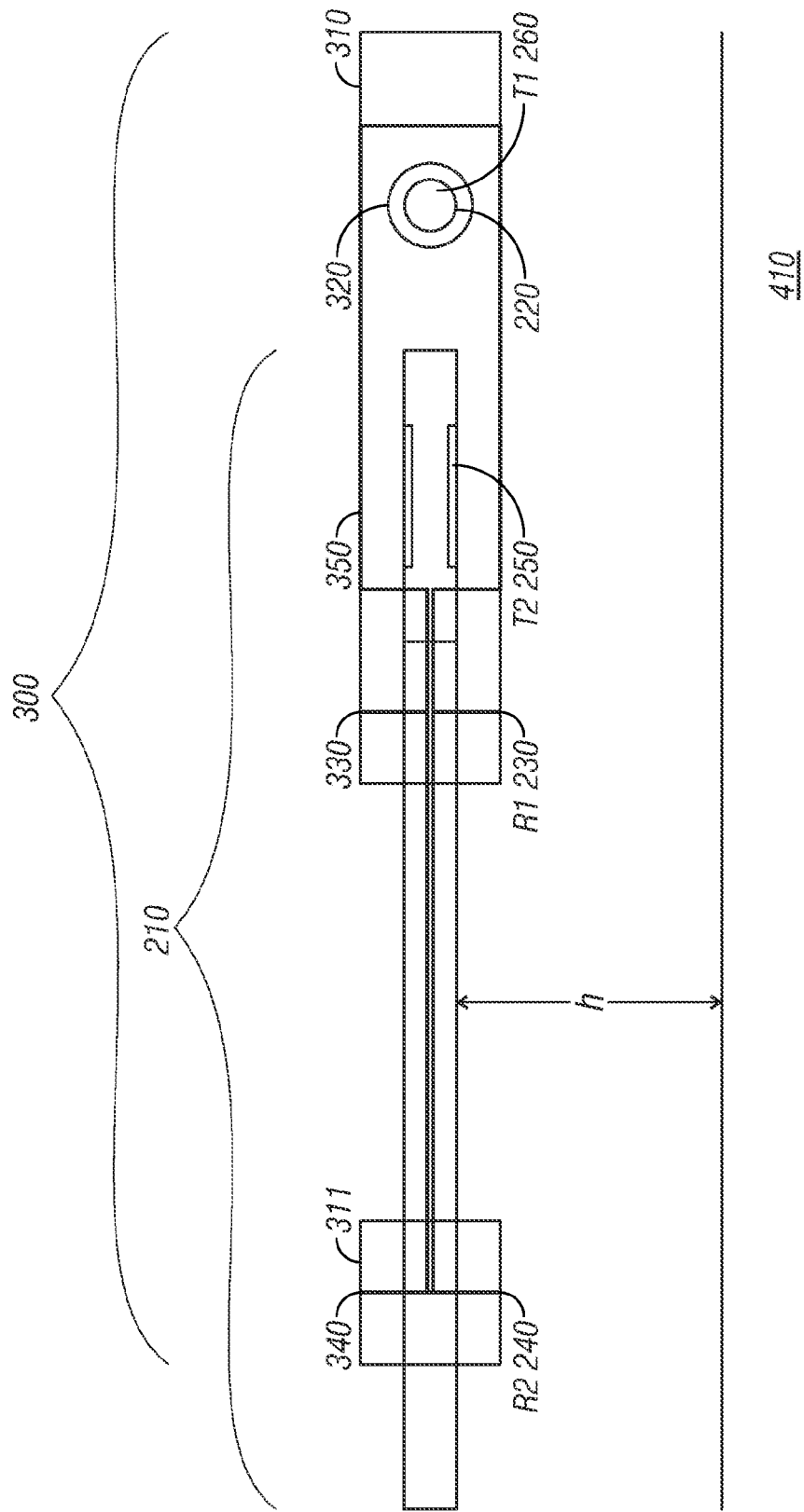
FIG. 4 shows a schematic of the deep-reading multi-component induction logging tool in the calibrator suspended above a conducting surface according to one embodiment of the present disclosure.

FIG. 4 shows sub 210 and sub 220 in the calibrator 300 positioned height h above a conducting surface 410 such as the surface of the earth.

Figure 5:
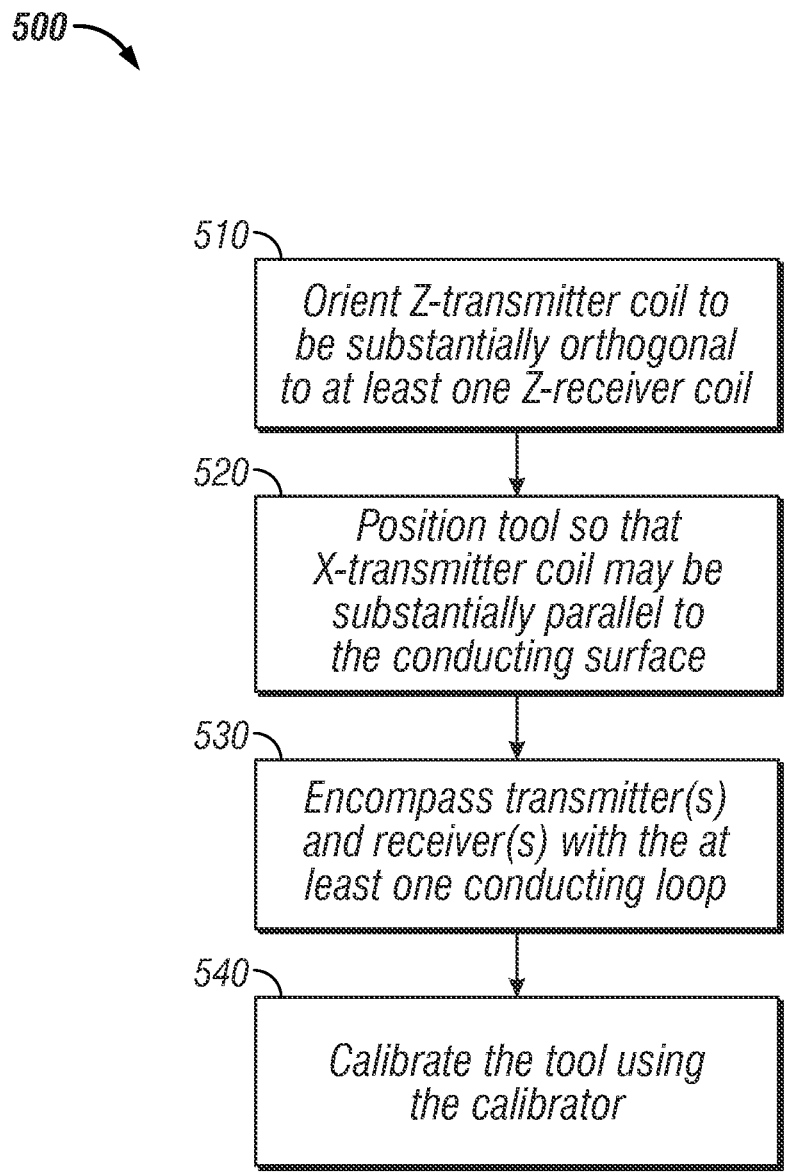
FIG. 5 shows a flow chart of a method for calibrating the deep-reading multi-component induction logging tool using the calibrator according to one embodiment of the present disclosure.

FIG. 5 shows an exemplary method 500 according to one embodiment of the present disclosure. In step 510, Z-transmitter coil 260 of tool 200 may be oriented to be substantially orthogonal to at least one Z-receiver coil 230, 240. In step 520, the tool 200 may be positioned such that X-transmitter coil 250 may be substantially parallel to the conducting surface 410. The orientation and positioning of the coils 230, 240, 250, 260 relative to the conducting surface 410 may minimize ground effects during calibration. In step 530, transmitter coil 260 and the at least one receiver coil 230, 240 of the tool 200 may be encompassed by at least one conducting loop of calibrator 300. In some embodiments, the at least one conducting loop may include two or more conducting loops 330, 340, 350 interconnected by electrical conductors. In step 540, the tool 200 may be calibrated using the calibrator 300. In some embodiments, calibration may include activating one or more of the transmitter coils 250, 260. In some embodiments, calibration may include estimating and/or compensating for a difference between a response measured at a receiver coil 230, 240 due to an activated transmitter coil 250, 260 and a response of a receiver coil 230, 240 estimated from a model.

Implicit in the processing of the data is the use of a computer program implemented on a suitable machine readable medium that enables the processor to perform the control and processing. The term processor as used in this application is intended to include such devices as field programmable gate arrays (FPGAs). The machine readable medium may include ROMs, EPROMs, EAROMs, Flash Memories and Optical disks. As noted above, the processing may be done downhole or at the surface, by using one or more processors. In addition, results of the processing, such as an image of a resistivity property, can be stored on a suitable medium.

While the foregoing disclosure is directed to the one mode embodiments of the disclosure, various modifications will be apparent to those skilled in the art. It is intended that all variations be embraced by the foregoing disclosure.

What is claimed is:

1. A method of calibrating a multi-component induction logging tool, comprising:
    orienting a first sub including a Z-transmitter coil so that a direction of operation of the Z-transmitter coil on the first sub is substantially orthogonal to a direction of operation of at least one Z-receiver coil on a second sub and so that the first sub is at least partially encompassed by the second sub, and wherein the Z-transmitter coil, an X-transmitter coil on the second sub, and the at least one Z-receiver coil are encompassed with at least one conducting loop of a calibrator, the first sub and the second sub being detachable parts of a multi-component induction logging tool;
    positioning the multi-component induction logging tool such that a direction of operation of the X-transmitter coil on the second sub is substantially parallel to a conducting surface exterior to the tool, wherein the length of the conducting surface is greater than an axial length of the second sub; and
    using the calibrator to calibrate the multi-component induction logging tool.

2. The method of claim 1, wherein the positioning includes rotating the first sub.

3. The method of claim 2, wherein the rotation of the first sub is in a plane that is substantially orthogonal to a longitudinal axis of the transmitter coil.

4. The method of claim 1, wherein the at least one conducting loop encompassing the Z-transmitter coil and the Z-receiver coil axially.

5. The method of claim 4, wherein the at least one conducting loop comprises a plurality of connected conducting loops.

6. The method of claim 1, wherein the conducting surface is a surface of the earth.

7. The method of claim 1, wherein the multi-component induction logging tool comprises the at least one conducting loop and at least one housing configured to house the at least one conducting loop.

8. A system for multi-component induction logging, comprising:
  a multicomponent induction logging tool including a first sub and a second sub, the multicomponent induction logging tool having a Z-transmitter coil, an X-transmitter coil, and at least one Z-receiver coil disposed thereon, wherein the first sub includes the Z-transmitter coil and the second sub includes the at least one Z-receiver coil and the X-transmitter coil, the subs being detachable and configured for reorientation relative to each other; and
  an apparatus comprising at least one conducting loop and at least one housing configured to perform the method of claim 1.

9. The method of claim 1, wherein the calibrator is housed in a housing of the multi-component induction logging tool.

* * * * *